(12) United States Patent
Nobuoka et al.

(10) Patent No.: US 10,963,726 B2
(45) Date of Patent: Mar. 30, 2021

(54) ARTICLE RECOGNITION DEVICE

(71) Applicant: TOSHIBA TEC KABUSHIKI KAISHA, Tokyo (JP)

(72) Inventors: Tetsuya Nobuoka, Shizuoka (JP); Masaaki Yasunaga, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 45 days.

(21) Appl. No.: 16/404,855

(22) Filed: May 7, 2019

(65) Prior Publication Data
US 2019/0347504 A1    Nov. 14, 2019

(30) Foreign Application Priority Data
May 8, 2018    (JP) .............................. JP2018-089976

(51) Int. Cl.
*G06K 9/48* (2006.01)
*G06K 9/46* (2006.01)
*G06K 9/62* (2006.01)
*G06K 7/10* (2006.01)
*G06K 9/00* (2006.01)

(52) U.S. Cl.
CPC ....... *G06K 9/4604* (2013.01); *G06K 7/10732* (2013.01); *G06K 9/00201* (2013.01); *G06K 9/6212* (2013.01)

(58) Field of Classification Search
CPC ............. G06K 9/4604; G06K 7/10732; G06K 9/00201; G06K 9/6212; G06K 9/00624; G06K 9/183; G06K 9/6215; G06K 9/4671; H04N 7/18; H04N 5/2252; H05K 13/041; H05K 13/0812; G06Q 30/00; G06Q 40/00; G06Q 99/00; G06T 7/0004
USPC .............................................. 382/199; 705/35
See application file for complete search history.

(56) References Cited

U.S. PATENT DOCUMENTS

| | | | | |
|---|---|---|---|---|
| 7,353,994 | B2 * | 4/2008 | Farrall ..................... | G06K 7/12 235/454 |
| 8,042,740 | B2 * | 10/2011 | Knowles ................ | G07G 3/006 235/462.42 |
| 9,129,404 | B1 * | 9/2015 | Wagner .............. | G06Q 30/0643 |
| 10,574,848 | B1 * | 2/2020 | Moro .................. | H04N 1/00843 |
| 2005/0127185 | A1 * | 6/2005 | Wilz, Sr. ............ | G06K 7/10673 235/462.48 |
| 2006/0195226 | A1 * | 8/2006 | Matsukawa .............. | B25J 9/162 700/245 |

(Continued)

FOREIGN PATENT DOCUMENTS

WO    WO-2014020945 A1 *    2/2014    ........... G06K 9/6201

*Primary Examiner* — Mahendra R Patel
(74) *Attorney, Agent, or Firm* — Amin, Turocy & Watson, LLP

(57) ABSTRACT

According to one embodiment, an article recognition device includes an image interface, a distance information interface, and a processor. The image interface acquires a captured image of an article placed on an installation base. The distance information interface acquires distance information indicating a distance from the installation base and the article. The processor extracts image information for recognizing the article from the image, generates a list including the image information, deletes image information having the same height as the height of the installation base from the list based on the distance information, and recognizes the article based on the image information of the list.

12 Claims, 7 Drawing Sheets

(56) References Cited

U.S. PATENT DOCUMENTS

| | | | | |
|---|---|---|---|---|
| 2007/0158428 A1* | 7/2007 | Havens | G06K 7/0004 | |
| | | | 235/462.45 | |
| 2008/0082497 A1* | 4/2008 | Leblang | G06F 16/58 | |
| 2008/0120129 A1* | 5/2008 | Seubert | G06Q 10/10 | |
| | | | 705/35 | |
| 2008/0253608 A1* | 10/2008 | Long | G06K 7/14 | |
| | | | 382/100 | |
| 2008/0290172 A1* | 11/2008 | Kotlarsky | G06K 7/10752 | |
| | | | 235/462.42 | |
| 2010/0017407 A1* | 1/2010 | Beniyama | G06K 9/00201 | |
| | | | 707/E17.016 | |
| 2010/0097461 A1* | 4/2010 | Utsumi | H04N 5/2252 | |
| | | | 348/143 | |
| 2011/0029922 A1* | 2/2011 | Hoffberg | H04N 21/4622 | |
| | | | 715/811 | |
| 2013/0096713 A1* | 4/2013 | Takizawa | B65G 61/00 | |
| | | | 700/224 | |
| 2014/0079299 A1* | 3/2014 | Sukegawa | G06K 9/00288 | |
| | | | 382/118 | |
| 2014/0191037 A1* | 7/2014 | Matsuhisa | G06K 7/10861 | |
| | | | 235/455 | |
| 2014/0351073 A1* | 11/2014 | Murphy | G01B 11/02 | |
| | | | 705/23 | |
| 2016/0300115 A1* | 10/2016 | Yasunaga | G06K 9/4604 | |
| 2016/0379076 A1* | 12/2016 | Nobuoka | G06K 9/6215 | |
| | | | 382/103 | |
| 2017/0193319 A1* | 7/2017 | Yasunaga | G06K 9/6202 | |
| 2020/0012878 A1* | 1/2020 | Iio | G06K 9/3208 | |

\* cited by examiner

US 10,963,726 B2

ARTICLE RECOGNITION DEVICE

CROSS-REFERENCE TO RELATED APPLICATIONS

This application is based upon and claims the benefit of priority from Japanese Patent Application No. 2018-089976, filed in May 8, 2018, the entire contents of which are incorporated herein by reference.

FIELD

Exemplary embodiments described herein relate to an article recognition device and an article recognition method.

BACKGROUND

In some article recognition devices, a feature point is extracted from an image obtained by capturing an article and an article is recognized based on the extracted feature point. Such an article recognition device sometimes extracts a feature point from a region other than the article by including a pattern of an installation base where the article is installed, an external light ray, or the like in the image. As a result, there is a problem in that the article recognition accuracy of the article recognition device may decrease.

DETAILED DESCRIPTION

An exemplary embodiment provides an article recognition device capable of effectively recognizing an article.

In general, according to one embodiment, an article recognition device includes an image interface, a distance information interface, and a processor. The image interface acquires a captured image of an article placed in an installation base. The distance information interface acquires distance information indicating a distance from the installation base and the article. The processor extracts image information for recognizing the article from the image, generates a list including the image information, deletes image information having the same height as that of the installation base from the list based on the distance information, and recognizes the article based on the image information of the list.

Hereinafter, embodiments will be described with reference to the drawings.

First Embodiment

First, a first embodiment will be described.

An article recognition device according to the first embodiment recognizes an article. The article recognition device captures an image of articles which are set thereon. The article recognition device extracts feature points from the captured image. The article recognition device recognizes articles based on extracted feature points and the like.

For example, the article recognition device is set up at a cash register or the like for payment of goods. For example, the article recognition device recognizes goods. In addition, the article recognition device may be a device for settling the recognized goods. The article recognition device may be installed as a self-register by which a user performs settlement processing. Further, the article recognition device may be installed as an ordinary cash register by which a shop clerk at a store performs settlement processing. Further, the article recognition device may be installed as an inspection device or the like for determining whether the article is purchased after settlement.

Figure 1:
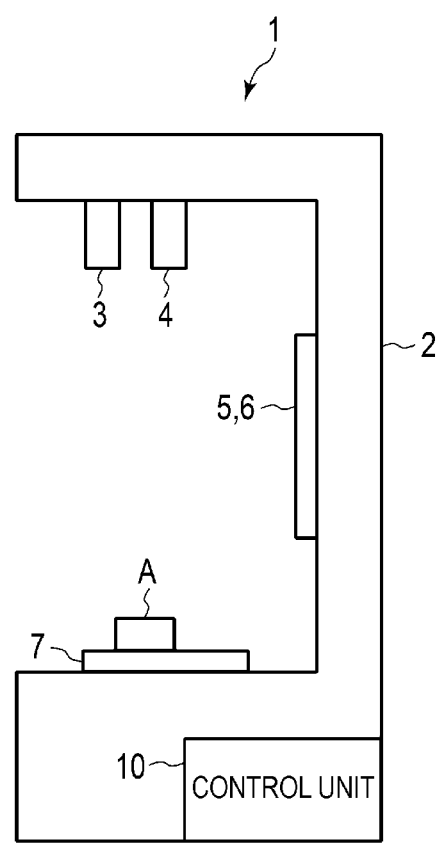
FIG. 1 is a diagram schematically illustrating a configuration example of an article recognition device according to a first embodiment.

FIG. 1 is a diagram schematically illustrating a configuration example of an article recognition device 1 according to the embodiment. As illustrated in FIG. 1, the article recognition device 1 includes a housing 2, a camera 3, a distance sensor 4, an operation unit 5, a display unit 6, an installation base 7, a control unit 10, and the like.

The housing 2 is a frame forming an outline of the article recognition device 1. The housing 2 is formed so that the installation base 7 can be installed thereon. In an example illustrated in FIG. 1, the housing 2 is formed in a U-shape.

The camera 3 is installed on an upper portion of the housing 2 so as to be directed downward. The camera 3 captures an image of an article A on the installation base 7. That is, the camera 3 is installed so as to capture the image of the article A from above. The camera 3 may be installed so as to capture the image of the article A from obliquely above. The position and direction in which the camera 3 is installed are not limited to a specific configuration. The camera 3 transmits the captured image to the control unit 10.

The distance sensor 4 is installed on the upper portion of the housing 2 so as to be directed downward. The distance sensor 4 measures a distance (for example, a distance from a predetermined reference plane to the distance sensor 4 or a distance from a predetermined reference plane to a plane horizontal to the distance sensor 4) from a predetermined reference plane.

The distance sensor 4 generates distance information indicating a distance from a predetermined reference plane based on the measurement result. For example, the distance information indicates coordinates of each point in a predetermined three-dimensional coordinate system. The distance sensor 4 transmits the generated distance information to the control unit 10.

For example, the distance sensor 4 includes a light source and a sensor for detecting reflected light rays of light rays irradiated from the light source. The distance sensor 4 measures a distance based on the reflected light ray of the light ray (visible light ray or invisible light ray) irradiated from the light source. For example, the distance sensor 4 may perform a Time-of-Flight (ToF) method in which the distance to a measurement target object is measured based on the time until the irradiated light ray is reflected by the measurement target object and reaches the distance sensor 4.

The distance sensor 4 may calculate the distance based on the parallax of respective images captured by two cameras (stereo cameras). Further, the distance sensor 4 may measure the distance from distortion of a dot pattern by projecting the dot pattern.

The configuration of the distance sensor 4 is not limited to a specific configuration.

The operation unit 5 receives inputs of various operations from an operator. The operation unit 5 transmits a signal indicating the accepted operation to a processor 11. In this case, the operation unit 5 includes a touch panel. Further, the operation unit 5 may further include a keyboard or a numeric keypad.

The display unit 6 displays various kinds of information under the control of the processor 11. For example, the display unit 6 includes a liquid crystal monitor. In this case, the display unit 6 is integrally formed with the operation unit 5.

The installation base 7 is installed in a lower portion of the housing 2. The installation base 7 is a base on which the article A is installed. For example, the installation base 7 is formed in a rectangular shape having a predetermined size. Further, the installation base 7 may be provided with a sensor for detecting that the article A is placed. The sensor transmits a signal indicating that the article A is placed to the processor 11.

The control unit 10 controls the entirety of the article recognition device 1. The control unit 10 recognizes the article A installed in the installation base 7 based on an instruction from an operator or the like. The control unit 10 receives various inputs from an operator through the operation unit 5. In addition, the control unit 10 displays various information to an operator through the display unit 6.

Figure 2:
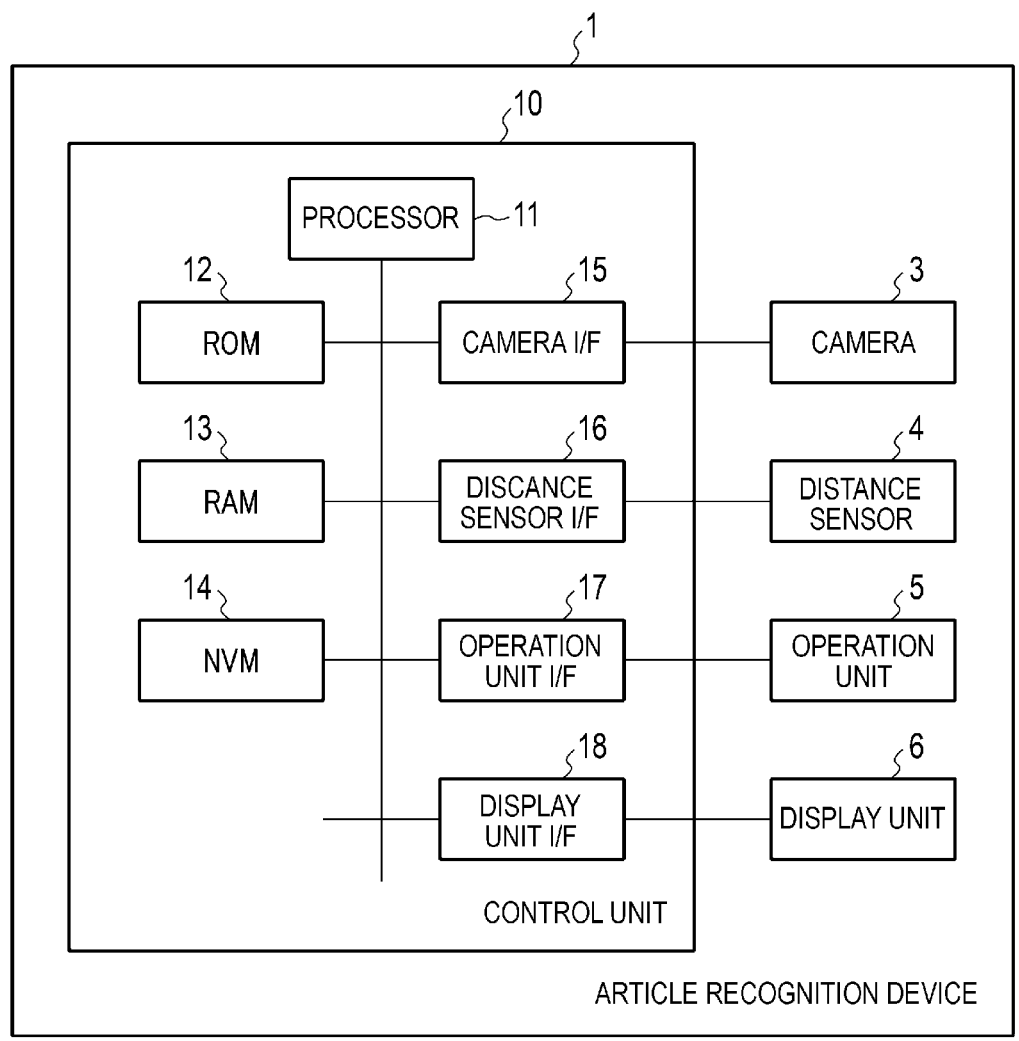
FIG. 2 is a block diagram illustrating a configuration example of the article recognition device.

FIG. 2 is a block diagram illustrating a configuration example of the article recognition device 1. As illustrated in FIG. 2, the article recognition device 1 includes the control unit 10, the camera 3, the distance sensor 4, the operation unit 5, the display unit 6, and the like. The control unit 10, the camera 3, the distance sensor 4, the operation unit 5, and the display unit 6 are electrically connected. The camera 3, the distance sensor 4, the operation unit 5, and the display unit 6 are as described above.

The control unit 10 includes the processor 11, a ROM 12, a RAM 13, an NVM 14, a camera interface 15, a distance sensor interface 16, an operation unit interface 17, a display unit interface 18, and the like. The processor 11, the ROM 12, the RAM 13, the NVM 14, the camera interface 15, the distance sensor interface 16, the operation unit interface 17, and the display unit interface 18 are electrically connected. The camera interface 15 is electrically connected to the camera 3. The distance sensor interface 16 is electrically connected to the distance sensor 4. The operation unit interface 17 is electrically connected to the operation unit 5. The display unit interface 18 is electrically connected to the display unit 6.

The processor 11 controls the overall operation of the control unit 10. That is, the processor 11 controls the operation of the entire article recognition device 1. The processor 11 may be provided with an internal cache and various interfaces. The processor 11 realizes various processes by executing a program stored in the internal cache, the ROM 12, or the NVM 14 in advance.

Further, some of the various functions realized by the processor 11 executing the program may be realized by a hardware circuit. In this case, the processor 11 controls the function executed by the hardware circuit.

The ROM 12 is a nonvolatile memory in which a control program, control data, and the like are stored in advance. The control program and the control data stored in the ROM 12 are incorporated in advance according to the specification of the control unit 10. The ROM 12 stores, for example, a program for controlling a circuit board of the control unit 10.

The RAM 13 is a volatile memory. The RAM 13 temporarily stores data being processed by the processor 11 and the like. The RAM 13 stores various application programs based on instructions from the processor 11. Further, the RAM 13 may store data necessary for executing the application program, an execution result of the application program, and the like.

The NVM 14 is a nonvolatile memory capable of writing and rewriting data. The NVM 14 includes, for example, a Hard Disk Drive (HDD), a Solid State Drive (SSD), an Electrically Erasable Programmable Read-Only Memory (Registered Trademark) (EEPROM), or a flash memory. The NVM 14 stores control programs, applications, various data, and the like according to the operational purpose of the control unit 10.

The NVM 14 stores article information. The article information is information on the article. The article information stores an article code, dictionary information, and outline information in association with one another.

The article code is an identifier indicating an article. For example, the article code is composed of numerical values, character strings, symbols, combinations thereof, or the like.

The dictionary information is information for specifying an article by using a local feature amount. The dictionary information stores feature points and feature amounts of the article image. For example, in the dictionary information, the positions and feature amounts of a plurality of feature points are associated and stored as a feature point set. Further, the dictionary information may store the feature point set of the image of each surface of the article.

The outline information indicates the outline of the article in the coordinate system of the feature point of the dictionary information. That is, the outline information indicates a relative positional relationship between the position of the feature point and the outline. For example, the outline information indicates the coordinates of four corners of the article.

The article information may include external dimensions of the article, article name, price, and the like. The structure of the article information is not limited to a specific configuration.

The NVM 14 stores the article information on each article in advance. For example, the processor 11 receives the article information from an external device and stores the information in the NVM 14. Further, the article information may be updated as appropriate.

The camera interface 15 (image interface) is an interface for sending and receiving data to and from the camera. For example, the camera interface 15 transmits a signal instructing image-capturing to the camera 3 based on the control of processor 11. Also, the camera interface 15 acquires a captured image obtained by image-capturing from the camera 3. For example, the camera interface 15 may support a USB connection.

The distance sensor interface 16 (distance information interface) is an interface for sending and receiving data with the distance sensor 4. For example, the distance sensor interface 16 transmits a signal which causes the distance sensor 4 to acquire the distance information based on the control of the processor 11. Also, the distance sensor interface 16 obtains the distance information from distance sensor 4. For example, distance sensor interface 16 may support a USB connection.

The operation unit interface 17 is an interface for sending and receiving data to and from the operation unit 5. For example, the operation unit interface 17 receives a signal indicating an operation accepted from an operator from the operation unit 5. For example, the operation unit interface 17 may support a USB connection.

The display unit interface 18 is an interface for sending and receiving data to and from the display unit 6. Further, the display unit interface 18 transmits information indicating a screen to be displayed to an operator to the display unit 6 based on the control of the processor 11. For example, the display unit interface 18 may support a USB connection.

The article recognition device 1 may have a configuration according to necessity besides the configuration as illustrated in FIGS. 1 and 2 or a specific configuration may be excluded from the article recognition device 1.

Next, the function realized by the article recognition device 1 will be described. The function realized by the article recognition device 1 is realized by the processor 11 executing the program stored in the ROM 12, the NVM 14 or the like.

First, the processor 11 has a function of acquiring an image (captured image) obtained by capturing the image of the installation base 7 on which the article is placed. In this case, the processor 11 acquires an image capturing the article placed on the installation base 7.

For example, the processor 11 detects that the article is placed by a user on the installation base 7. For example, the processor 11 detects that the article is placed on the installation base 7 based on a signal from the installation base 7. The processor 11 may detect that the article is placed on the installation base 7 based on the image from the camera 3. Further, the processor 11 may accept an operation indicating that the article is placed on the installation base 7 from a user.

When it is detected that the article is placed, the processor 11 captures an image including the article. For example, the processor 11 transmits a signal for capturing an image to the camera 3. The processor 11 acquires the captured image from the camera 3. In order to capture an image, the processor 11 may set the image-capture parameters to the camera 3.

Further, the processor 11 may acquire a captured image from an external device.

Figure 3:
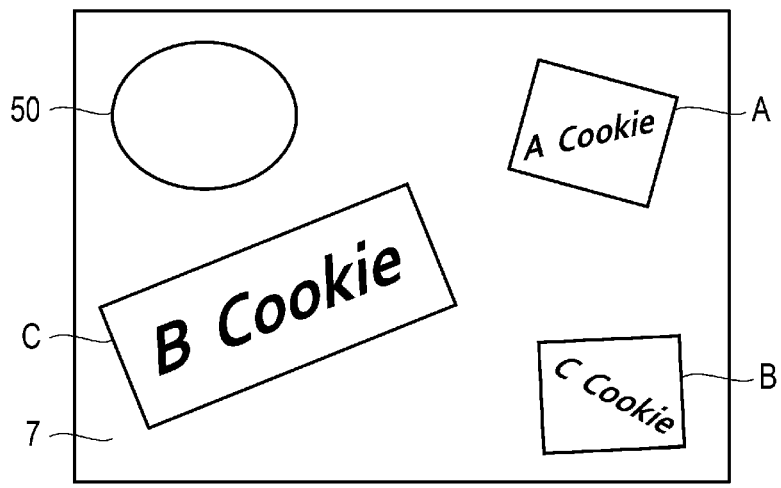
FIG. 3 is a diagram illustrating an example of a captured image.

FIG. 3 illustrates an example of the captured image. In an example illustrated in FIG. 3, the captured image shows the installation base 7, an external light ray 50, the article A, an article B, an article C, and the like.

The external light ray 50 is a light ray which illuminates the installation base 7. For example, the external light ray 50 is sunlight or an illumination light ray.

The articles A, B, and C are articles to be recognized. The articles A, B, and C are placed on the installation base 7 with a specific surface on the top.

Four or more articles may be captured in the captured image. In addition, one or two articles may be captured in the captured image. The number of articles captured by the captured image is not limited to a specific number.

In addition, the processor 11 has a function of acquiring the distance information from the distance sensor 4.

When the processor 11 detects that the article is placed by a user on the installation base 7, the processor 11 acquires the distance information from the distance sensor 4. For example, the processor 11 sends a signal for measuring the distance to distance sensor 4. The processor 11 acquires the distance information from the distance sensor 4.

The processor 11 may acquire the distance information after acquiring the captured image. Further, the processor 11 may acquire the distance information simultaneously with the captured image. Further, the processor 11 may acquire the distance information before acquiring the captured image.

Further, the processor 11 has a function of extracting feature point information (image information) for recognizing an article from the captured image.

That is, the processor 11 extracts feature points from the captured image and calculates the feature amount of each feature point. The feature point information includes information such as a feature point and a feature amount.

For example, the feature point is a point uniquely determined within a local region such as a point at a corner portion of the image and extreme points (maxima/minimal points) of the second derivative function of the image density. The feature points are indicated by coordinates (x, y) representing positions.

The feature amount is a value calculated from an image of the feature point or around the feature point. For example, the feature amount is calculated based on a density pattern or the like in the vicinity of the feature point.

The configuration of the feature point information is not limited to a specific configuration.

The processor 11 stores the extracted feature point information in a feature point list.

Figure 4:
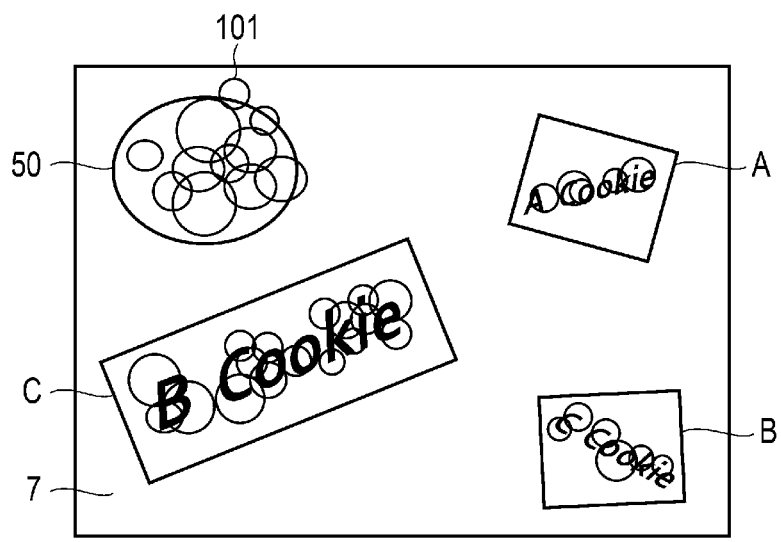
FIG. 4 is a diagram illustrating an example of feature point information.

FIG. 4 indicates an example of the feature point list extracted from the captured image by the processor 11. In FIG. 4, a circle 101 indicates a feature point. Further, the size of the circle 101 indicates the feature amount. As illustrated in FIG. 4, the processor 11 extracts a plurality of the circles 101. The processor 11 extracts the plurality of circles 101 from each of the articles A to C. In addition, the processor 11 extracts the plurality of circles 101 from the external light ray 50.

Further, the processor 11 has a function of deleting the feature point information extracted on the installation base 7 from the feature point list based on the distance information.

The processor 11 specifies the height of each feature point based on the distance information. When the height of each feature point is specified, the processor 11 deletes the feature point information having the same height as the installation base 7 from the feature point list. For example, the processor 11 deletes the feature point information of which the height from the installation base 7 is equal to or less than a predetermined threshold value from the feature point list.

Figure 5:
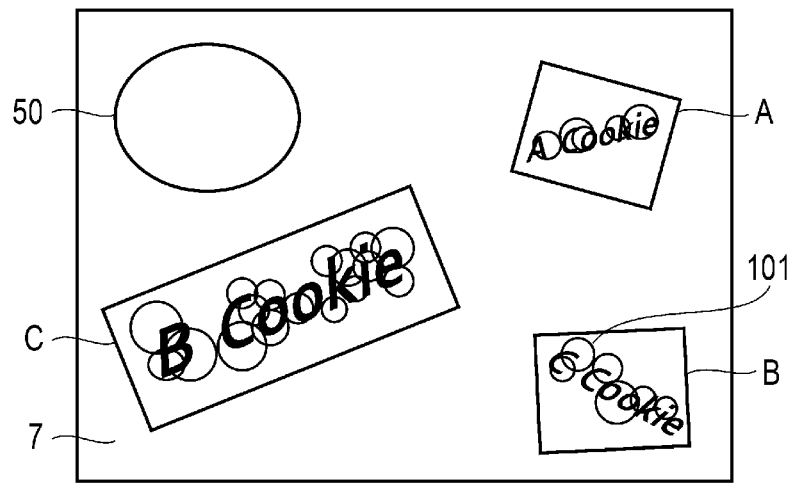
FIG. 5 is a diagram illustrating an example of the feature point information.

FIG. 5 illustrates an example of a feature point list in which the feature point information having the same height of the installation base 7 is deleted. The external light ray 50 appears on the installation base 7. Therefore, the feature point information extracted on the external light ray 50 has the same height as the installation base 7. Therefore, as illustrated in FIG. 5, the processor 11 deletes the feature point information on the external light ray 50 from the feature point list.

In addition, the processor 11 has a function of recognizing an article based on the feature point list. That is, the processor 11 recognizes an article from the feature point information other than the feature point information extracted on the installation base 7.

The processor 11 acquires one piece of article information from the NVM 14. When the article information is acquired, the processor 11 calculates a similarity rate R of the feature point set based on the feature point set of the article information and the feature point list.

The processor 11 calculates the similarity rate R for each piece of article information stored in the NVM 14. When the similarity rate R of each piece of article information is calculated, the processor 11 specifies a highest similarity rate Rmax from the similarity rate R. When the similarity rate Rmax is specified, the processor 11 determines whether the similarity rate Rmax exceeds a threshold value Rthr. When determining that the similarity rate Rmax exceeds the threshold value Rthr, the processor 11 recognizes an article corresponding to the article information of the similarity rate Rmax. For example, the processor 11 gets an article code of the article.

Further, the processor 11 may recognize an article by reading a barcode from the captured image. For example, the processor 11 extracts a barcode region in which the barcode appears by predetermined image processing. When the barcode region is specified, the processor 11 decodes the barcode in the barcode region. That is, the processor 11 reads the article code specifying the article from the barcode. The processor 11 recognizes the article from which the article code is read.

In addition, the processor 11 has a function of specifying the article region in which the article recognized from the captured image appears.

The processor 11 acquires the outline information of the recognized article. The processor 11 specifies the article region based on the position of the feature point of the feature point information used for recognition and the outline information in the captured image. For example, the processor 11 specifies the area in which an upper surface of the article appears in the captured image, from the position of the feature point of the feature point information used for recognition and the outline information in the captured image. The processor 11 specifies the specified region as the article region.

When the barcode is read and the article is recognized, the processor 11 acquires dictionary information of the article information of the recognized article. The processor 11 matches the feature point information of the feature point list and the dictionary information. For example, the processor 11 extracts a feature point closest to the feature point set of the dictionary information from the feature point list. The processor 11 may extract the feature point corresponding to the feature point set from the feature points within a predetermined distance from the bar code region or within the predetermined region set based on the position of the bar code region.

When the feature point closest to the feature point set of the dictionary information is extracted from the feature point list, the processor 11 specifies the article region based on the position of the extracted feature point and the outline information.

In addition, the processor 11 has a function of deleting feature point information in the article region from the feature point list.

The processor 11 determines whether the feature point of each feature point information in the feature point list is within the article region. The processor 11 deletes the feature point information of the feature point determined to be in the article region from the feature point list.

The processor 11 recognizes each article from the captured image by repeating from the recognition operation of the article to the deletion operation of the feature point information.

In the example illustrated in FIG. 5, for example, the processor 11 specifies the article A based on the feature point list. When the article A is specified, the processor 11 specifies the article region of the article A. When the article region of the article A is specified, the processor 11 deletes the feature point information in the article region of the article A from the feature point list.

Figure 6:
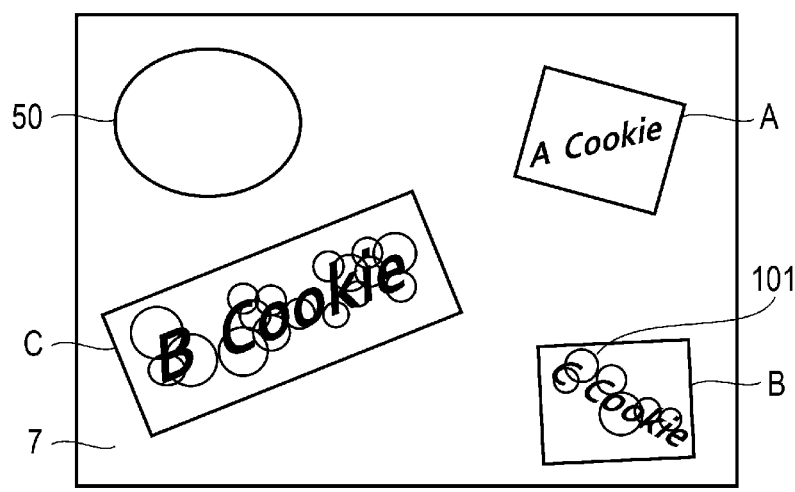
FIG. 6 is a diagram illustrating an example of the feature point information.

FIG. 6 illustrates an example of the feature point list in which the feature point information in the article region of the article A is deleted. As illustrated in FIG. 6, the circles 101 in the article region of article A are deleted.

When feature point information in the article region of the article A is deleted from the feature point list, the processor 11 specifies the article B based on the feature point list. When the article B is specified, the processor 11 specifies the article region of the article B. When the article region of the article B is specified, the processor 11 deletes the feature point information in the article region of the article B from the feature point list.

Figure 7:
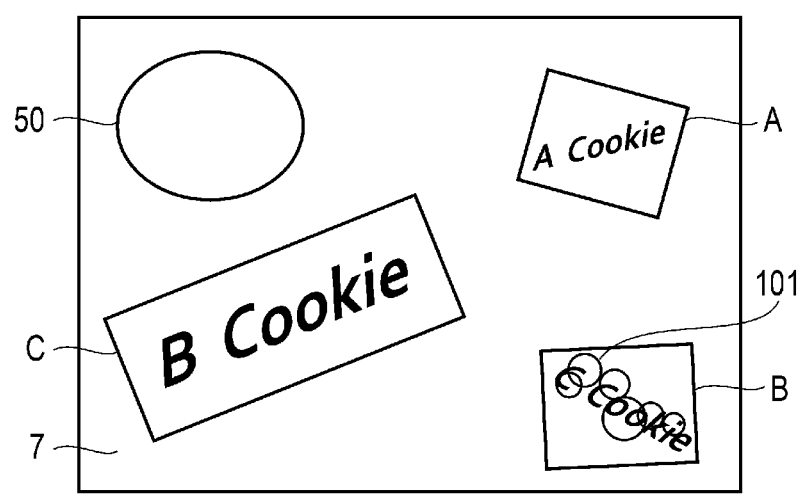
FIG. 7 is a diagram illustrating an example of the feature point information.

FIG. 7 illustrates an example of the feature point list in which the feature point information in the article region of the article B is deleted. As illustrated in FIG. 7, the circles 101 in the article regions of the article A and the article B are deleted.

Similarly, the processor 11 recognizes the article C.

Further, when the article cannot be recognized, the processor 11 has a function of outputting a warning based on the number of pieces of the feature point information of the feature point list.

For example, when determining that the similarity rate Rmax is equal to or less than the threshold value Rthr in the recognition process, the processor 11 determines that the article cannot be recognized (recognition failed). When determining that the article cannot be recognized, the processor 11 counts the number of pieces of the feature point information in the feature point list. When the number of pieces of the feature point information in the feature point list is counted, the processor 11 determines whether the counted number is equal to or less than a predetermined threshold value.

When determining that the counted number is equal to or less than the predetermined threshold value, the processor 11 determines that the recognition of the article is completed.

When determining that the counted number exceeds the predetermined threshold value, the processor 11 determines that there is an unrecognized article and outputs a warning indicating that there is an unrecognized article. For example, the processor 11 displays a warning using the display unit 6. In addition, the processor 11 may transmit a warning to an external device. The method by which the processor 11 outputs a warning is not limited to a specific method.

Figure 8:
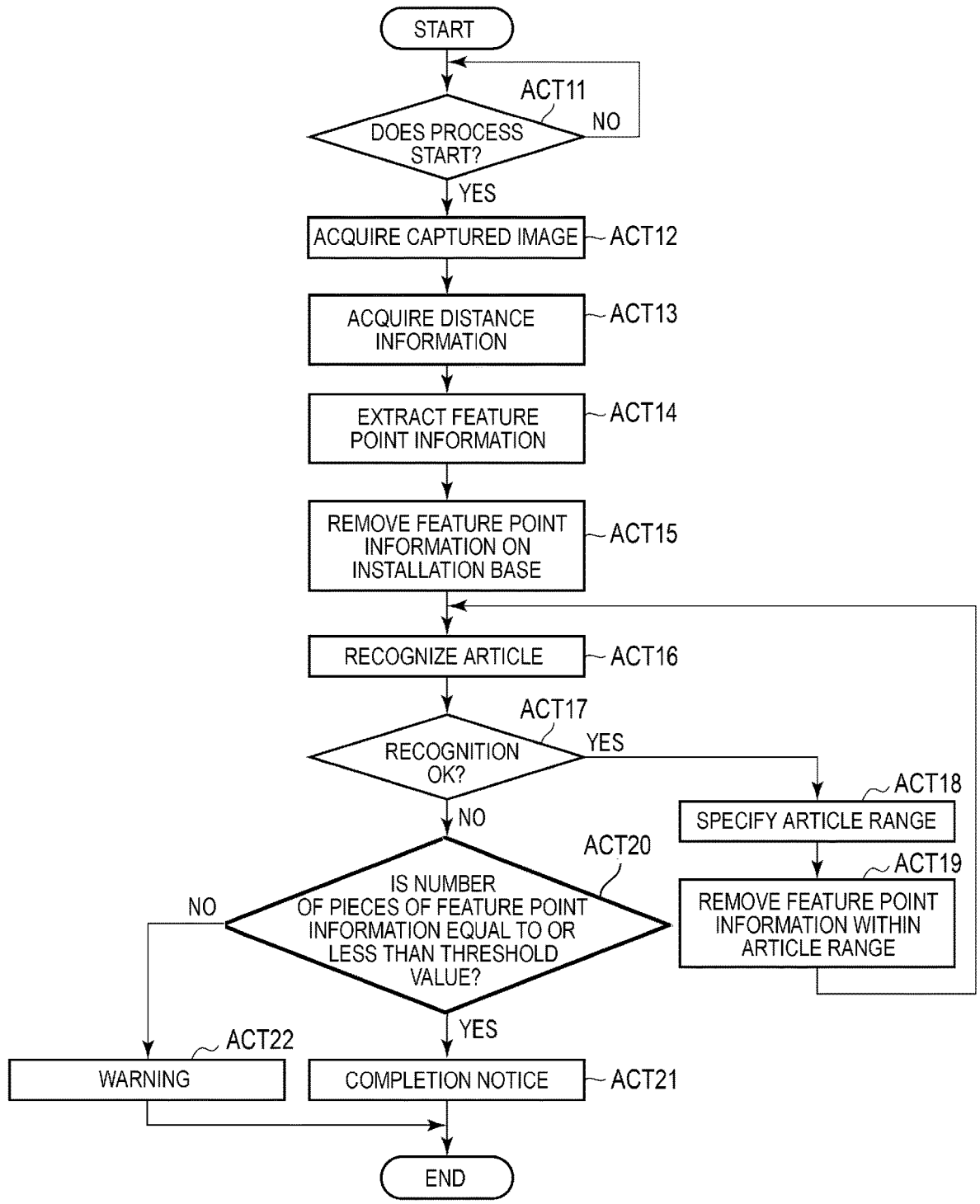
FIG. 8 is a flowchart illustrating an operation example of the article recognition device.

Next, an operation example of the article recognition device 1 will be described. FIG. 8 is a flowchart for explaining the operation example of the article recognition device 1.

First, the processor 11 of the article recognition device 1 determines whether an article is placed in the installation base 7 (ACT11). When determining that an article is not placed on the installation base 7 (ACT11, NO), the processor 11 returns to ACT11.

When determining that the article is placed on the installation base 7 (ACT11, YES), the processor 11 acquires the captured image using the camera 3 (ACT12). When the captured image is acquired, the processor 11 acquires the distance information using the distance sensor 4 (ACT13).

When the distance information is acquired, the processor 11 extracts the feature point information from the captured image and stores the information in the feature point list (ACT14). When the feature point information is extracted from the captured image and stored in the feature point list, the processor 11 deletes the feature point information extracted on the installation base 7 from the feature point list (ACT15).

When the feature point information is deleted, the processor 11 recognizes the article based on the feature point information of the feature point list (ACT16). When the article is successfully recognized (ACT17, YES), the processor 11 specifies the article region of the article recognized in the captured image (ACT18). When the article region is specified, the processor 11 deletes the feature point information in the article region from the feature point list (ACT19).

When the feature point information in the article region is deleted from the feature point list, the processor 11 returns to ACT16.

When recognition of the article fails, the processor 11 determines whether the number of pieces of feature point information in the feature point list is equal to or less than a predetermined threshold value (ACT20). When determining that the number of pieces of the feature point information in the feature point list is equal to or less than the predetermined threshold value (ACT20, YES), the processor 11 displays on the display unit 6 that the recognition process is completed (ACT21).

When determining that the number of pieces of the feature point information in the feature point list exceeds a predetermined threshold value (ACT20, NO), the processor 11 outputs a warning indicating that there is an article which is failed in recognition (ACT22).

When the completion of the recognition processing is displayed on the display unit 6 (ACT21) or when a warning indicating that there is an article failing to be recognized is output (ACT22), the processor 11 terminates the operation.

Further, the processor 11 may settle the recognized article. For example, the processor 11 acquires credit card information from a user and settles the article based on the credit card information. In addition, the processor 11 may accept cash from a user and settle the article.

In addition, the processor 11 may transmit an article code of the recognized article to the external device.

The processor 11 may display information indicating the recognized article on the display unit 6.

The article recognition device configured as described above deletes the feature point information extracted on the installation base on which the article is placed in the captured image. The article recognition device recognizes the article based on the remaining feature point information. As a result, the article recognition device can delete feature point information caused by factors other than the article such as external light rays or patterns of the installation base. Therefore, the article recognition device can properly recognize the article.

The article recognition device deletes the feature point information in the article region of the recognized article. As a result, the article recognition device can delete the feature point information caused by the already recognized article. Therefore, the article recognition device can recognize the article based on the feature point information generated by the unrecognized article.

In addition, the article recognition device outputs a warning when the number of pieces of the feature point information remaining after recognition of the article exceeds a predetermined threshold value. As a result, the article recognition device can warn that there is an article which is failed to be recognized.

Second Embodiment

Next, a second embodiment will be described.

The article recognition device according to the second embodiment is different from that according to the first embodiment in that a region wider than the upper surface of the recognized article is specified as the article region. Therefore, in other respects, the same reference numerals and letters are given and the detailed description thereof is omitted.

Since the configuration of the article recognition device 1 according to the second embodiment is similar to that according to the first embodiment, the description thereof is omitted.

Next, the function realized by the article recognition device 1 will be described. The function realized by the article recognition device 1 is realized by the processor 11 executing a program stored in the ROM 12, the NVM 14, or the like.

The processor 11 has a function of specifying a region wider than the upper surface of the recognized article as an article region.

The processor 11 acquires outline information of the recognized article. The processor 11 specifies the region in which the upper surface of the article appears based on the position of the feature point of the feature point information used for recognition and the outline information in the captured image. When the region in which the upper surface of the article appears is specified, the processor 11 specifies a region larger than the region as the article region.

For example, the processor 11 specifies the region in which the upper surface of the article appears and the region in which the side surface of the article appears as the article region. For example, the processor 11 specifies the region in which the side surface of the article appears based on the characteristics of the camera, the distance to the article, the position of the article and/or the height of the article, and the like.

In addition, the processor 11 may specify a region obtained by enlarging the region in which the upper surface of the article appears with a predetermined magnification as the article region. Further, the processor 11 may specify the region obtained by enlarging the region in which the upper surface of the article appears by a predetermined dot as the article region. The method by which the processor 11 specifies the article region is not limited to a specific method.

Figure 9:
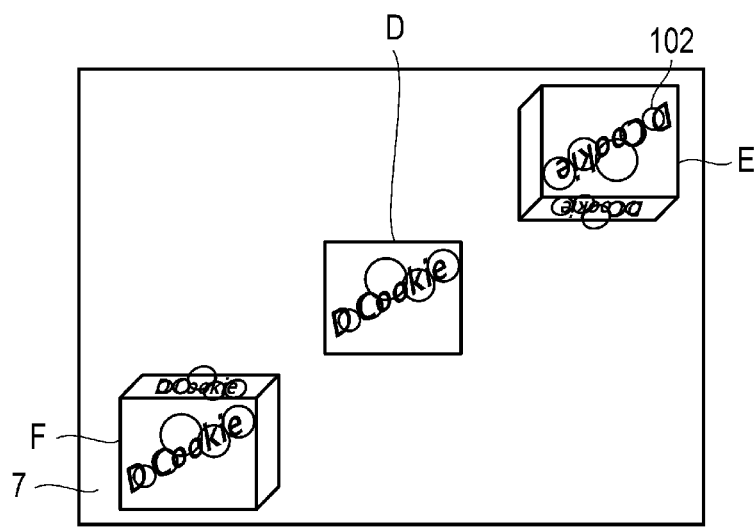
FIG. 9 is a diagram illustrating an example of feature point information according to a second embodiment.

FIG. 9 illustrates an example of the feature point list extracted from the captured image by the processor 11. In this example, it is assumed that the captured image shows an article D, an article E, and an article F. In FIG. 9, the circles 102 indicate the feature points. The size of the circle 102 indicates the feature amount. As illustrated in FIG. 9, the processor 11 extracts a plurality of circles 102.

The processor 11 extracts a plurality of circles 102 on each of the upper surfaces of the article D, the article E, and the article F. In addition, the processor 11 extracts a plurality of circles 102 on each of the side surfaces of the article E and the article F.

Figure 10:
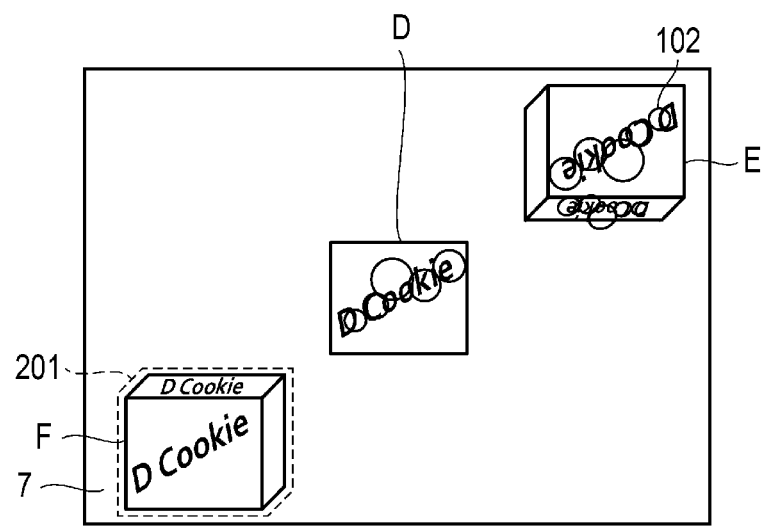
FIG. 10 is a diagram illustrating an example of the feature point information.

FIG. 10 illustrates an example of the article region specified by the processor 11. In this example, it is assumed that the processor 11 recognizes the article F. As illustrated in FIG. 10, the processor 11 specifies an article region 201 including the upper surface and the side surface of the article F. Further, the processor 11 deletes the feature point information in the article region 201 from the feature point list.

The operation example of the article recognition device 1 is the same as that according to the first embodiment, so the description thereof is omitted.

The article recognition device configured as described above extracts a region larger than the upper surface of the article as the article region from the captured image. As a result, the article recognition device can extract a region including the upper surface used for recognition of the article and the side surface of the article as the article region. Therefore, the article recognition device can delete the feature point information extracted from the side surface of the recognized article and the like. Therefore, the article recognition device can recognize articles more properly in subsequent recognition processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An article recognition device, comprising:
   an image interface configured to acquire a captured image of an article placed on an article table, wherein the article table is different from the article;
   a distance information interface configured to acquire distance information indicating a distance from the article table and the article; and
   a processor configured to:
      extract image information for recognizing the article from the image and generate a list including the image information, wherein the image information includes a feature point and a feature amount or an article code;
      delete image information having a same height as a height of the article table from the list based on the distance information;
      recognize the article based on the image information of the list;
      delete image information in an article region of the recognized article from the list; and
      recognize an article based on the list where the image information in the article region of the recognized article is deleted.

2. The device according to claim 1, wherein the article region includes a region on an upper surface of the article and a region on a side surface of the article.

3. The device according to claim 1, wherein the distance information interface comprises a light sensor.

4. The device according to claim 1, wherein the article recognition device is a settlement apparatus or a cash register.

5. An article recognition device, comprising:
   an image interface configured to acquire a captured image of an article placed on an article table, wherein the article table differs from the article;
   a distance information interface configured to acquire distance information indicating a distance from the article table and the article; and
   a processor, the processor configured to:
      extract image information for recognizing the article from the image and generate a list including the image information, wherein the image information includes a feature point and a feature amount or an article code;
      recognize the article based on the image information of the list;
      delete image information in an article region of the recognized article from the list based on the distance information;
      recognize the article based on the list where the image information in the article region of the recognized article is deleted; and
      output a warning if the number of pieces of image information in the list exceeds a predetermined threshold value when the article cannot be recognized from the list.

6. The device according to claim 5, wherein the article region includes a region on an upper surface of the article and a region on a side surface of the article.

7. The device according to claim 5, wherein the image interface comprises a light sensor.

8. The device according to claim 5, wherein the article recognition device is a settlement apparatus or a cash register.

9. An article recognition method, comprising:
   acquiring a captured image of an article placed on an article table, wherein the article table is different from the article;
   acquiring distance information indicating a distance from the article table and the article; and
   extracting image information for recognizing the article from the image and generating a list including the image information, wherein the image information includes a feature point and a feature amount or an article code;
   deleting image information having a same height as a height of the installation base from the list based on the distance information;
   recognizing the article based on the image information of the list;
   deleting image information in an article region of the recognized article from the list; and
   recognizing an article based on the list where the image information in the article region of the recognized article is deleted.

10. The article recognition method according to claim 9, wherein
   the article region includes a region on an upper surface of the article and a region on a side surface of the article.

11. The article recognition method according to claim 9, wherein
   acquiring distance information interface comprises using a light sensor.

12. The article recognition method according to claim 9, wherein
   the article recognition method is performed by a settlement apparatus or a cash register.

* * * * *